United States Patent [19]

Laakmann et al.

[11] Patent Number: 5,793,476
[45] Date of Patent: Aug. 11, 1998

[54] LASER TRANSPONDER AND METHOD FOR DISABLING LASER SPEED MONITORS

[75] Inventors: Peter Laakmann, Bothell; Yong Fang Zhang, Kirkland, both of Wash.

[73] Assignee: Lidatek L.L.C., Bothell, Wash.

[21] Appl. No.: 566,646

[22] Filed: Dec. 4, 1995

[51] Int. Cl.$^6$ ............................................ G01P 3/36
[52] U.S. Cl. ................................. 356/28; 356/28.5
[58] Field of Search ........................ 342/13, 14; 356/28, 356/28.5

[56] References Cited

U.S. PATENT DOCUMENTS

| | | |
|---|---|---|
| 3,978,342 | 8/1976 | Hagen et al. |
| 4,072,949 | 2/1978 | Van Brunt |
| 5,359,404 | 10/1994 | Dunne ............................ 356/5 |
| 5,406,287 | 4/1995 | Pinkus |

FOREIGN PATENT DOCUMENTS 24 08 058   8/1975   Germany.

OTHER PUBLICATIONS

P. Schroeder; Car and Driver; Nov. 1993, pp. 124–131.
P. Bedard; Car and Driver; pp. 87–92, Apr. 1992.
B. Keirstead et al; J. of Electronic Defense; vol. 15, No. 5, May 1992.

Samuels, M. et al., "Low Cost, Handheld Lidar System for Automotive Speed Detection and Law Enforcement", *SPIE vol. 1633 Lasar Radar VII*, pp. 147–159, 1992.

Milonni, Peter W. et al., "Some Laser Applications," *Lasers*, John Wiley & Sons, New York, 1988, pp. 585–589.

*Primary Examiner*—Stephen C. Buczinski
*Attorney, Agent, or Firm*—Seed and Berry LLP

[57] ABSTRACT

A laser transponder and method for disabling a laser-based speed monitor of the type that transmits a monitor laser beam at a moving motor vehicle. The monitor laser beam transmitted by the speed monitor is detected when it arrives at the motor vehicle. In response to detecting the monitor laser beam, a warning is output to the motor vehicle driver and a jamming laser beam is transmitted toward the speed monitor. The jamming laser beam includes a plurality of pulses separated from each other by a time period that is less than or equal to an amount of time needed for the monitor laser beam to travel from the speed monitor to the motor vehicle and back to the speed monitor. The jamming laser beam disables the speed monitor for a time period sufficient to allow the motor vehicle driver to reduce the speed of the motor vehicle.

21 Claims, 7 Drawing Sheets

LASER TRANSPONDER AND METHOD FOR DISABLING LASER SPEED MONITORS

TECHNICAL FIELD

The present invention relates to lasers and, more particularly, to laser transponders that disable laser-based speed monitors known as lidar velocity monitors.

BACKGROUND OF THE INVENTION

Police departments traditionally have employed radar speed monitors to monitor the velocities of motor vehicles. Such radar speed monitors transmit radio waves at a moving motor vehicle and receive the waves reflected back from the motor vehicle. The speed of the motor vehicle is calculated by determining the difference in time that it takes successive radio waves to return to the radar speed monitor from the motor vehicle. The radio waves transmitted by such radar speed monitors are dispersed over a large area, which causes the radio waves to be reflected off of numerous objects other than or in addition to the motor vehicle. Such reflections cause the radar speed monitors to detect false speed readings and enable the radar speed monitors to be detected by a radar detector at a significant range before the speed of the other motor vehicle can be monitored.

In recent years, the radar speed monitor has been replaced by a speed monitor known as a lidar speed monitor. A lidar speed monitor operates similar to a radar speed monitor except that the lidar speed monitor reflects a laser beam off of the motor vehicle rather than radio waves. Such a laser beam is much more narrow than the radio waves transmitted by the radar speed monitor, which results in a lidar speed monitor that is much more accurate and less detectable than radar speed monitors. The increased accuracy and reduced detectability arises because the narrow laser beam is not usually reflected off objects other than a small part of the motor vehicle being monitored.

A typical lidar speed monitor transmits a monitor laser beam at a carrier frequency of $3.315 \times 10^{14}$ Hz (905 nM in wavelength). The monitor laser beam typically includes a series of pulses at a pulse repetition frequency of 380 Hz with each pulse having a pulse width of approximately 20 nanoseconds and a peak power of 50 watts. The lidar speed monitor computes the range of the vehicle from the lidar speed monitor by determining how long it takes for a pulse to travel to the vehicle and back to the lidar speed monitor and multiplies that time by the speed of light. The lidar speed monitor computes the speed of the vehicle by calculating several sequential range measurements within a predetermined time period and dividing the difference between range measurements by the time period. In current lidar devices, approximately 100 pulses are used to compute an average speed for a vehicle within an accuracy of approximately 1 mph. Given that approximately 380 pulses are transmitted each second, the current lidar devices can determine speed in as little as ⅓ of a second. With so little time, a vehicle driver is unable to slow down quickly enough to avoid detection even if the monitor laser beam from the lidar were detected instantaneously.

Some have proposed overcoming the lidar speed monitors by actively disabling them long enough for the vehicle to slow down. Such proposals involve transmitting a jamming laser beam from the vehicle to the lidar speed monitor in a manner that completely disables the lidar speed monitor or causes the lidar speed monitor to calculate false speed readings. Proposed lidar jammers would operate by transmitting in the jamming laser beam a pulse train having a pulse repetition frequency that matches the pulse repetition frequency of the monitor laser beam lidar transmitted by the lidar speed monitor. Each pulse of the pulse train is transmitted so that it arrives at the lidar speed monitor sometime within the time period beginning when the lidar speed monitor transmits a pulse and ends when the lidar speed monitor receives the pulse reflected off the vehicle. The lidar speed monitor accepts only the first laser beam pulse received after a pulse of the monitor laser beam is transmitted, so each pulse of the jamming laser beam causes the lidar speed monitor to consider the jamming laser beam pulse to be the pulse reflected off the vehicle. As a result, the lidar speed monitor computes a false speed based on the jamming laser team pulses rather than the pulses reflected off the vehicle.

Figure 1:
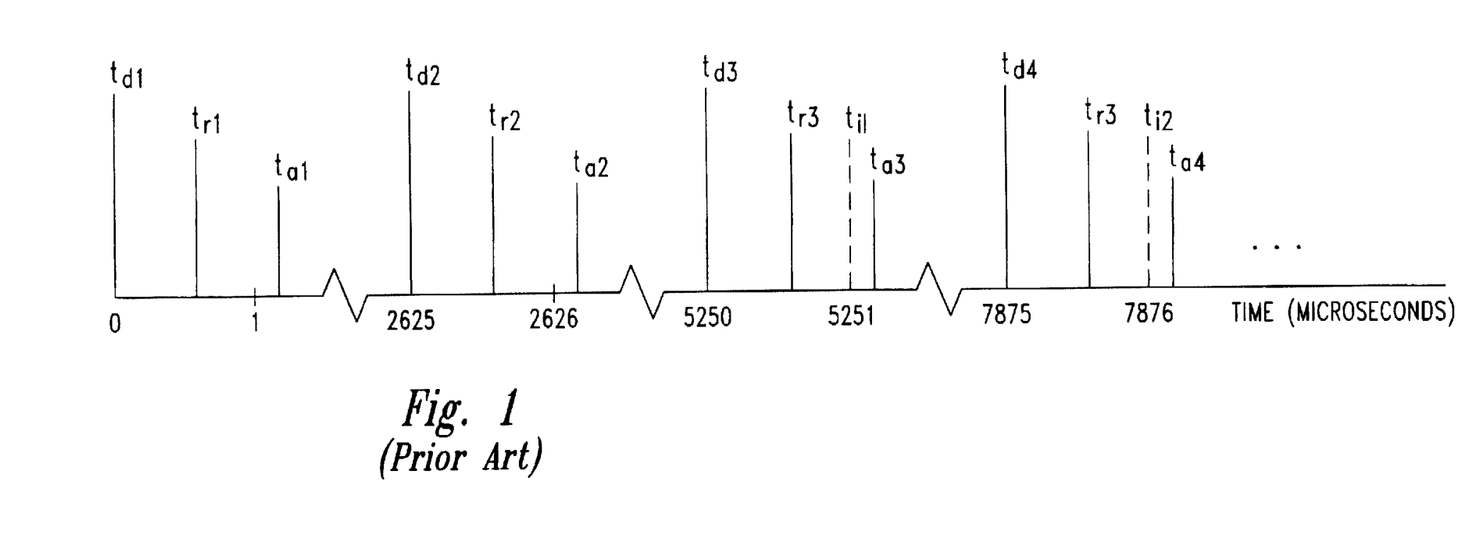
FIG. 1 is a timing diagram showing the laser beam pulses transmitted by prior art lidar detectors.

FIG. 1 is a timing diagram that shows how such prior art lidar jammers operate. At time $t_{d1}$ (0 seconds), the lidar speed monitor transmits the monitor laser beam with a laser pulse at a motor vehicle equipped with the lidar jammer. If the vehicle is 500 feet from the lidar speed monitor, then the laser pulse will be reflected off of the vehicle in approximately 0.51 microseconds ($t_{r1}$) and the reflected laser pulse will return to the lidar speed monitor after 1.16 microseconds ($t_{a1}$). Assuming that the pulse repetition frequency of the lidar speed monitor is 380 pulses per second, the lidar speed monitor transmits a second pulse at time $t_{d2}$, 2625 microseconds after the first pulse was transmitted at time $t_{d1}$. After the second pulse arrives at the vehicle at time $t_{r2}$, the lidar jammer on the vehicle can compute the pulse repetition frequency of the lidar speed monitor. Typically, the laser jammers wait to receive several pulses from the lidar speed monitor so that a more accurate determination of the pulse repetition frequency of the lidar speed monitor can be obtained. However, for the purposes of this example, it can be assumed that the pulse repetition frequency of the lidar speed monitor is determined after only two pulses. Based on the lidar jammer's determination of the pulse repetition frequency of the lidar speed monitor, the lidar jammer determines that the lidar speed monitor will transmit a pulse every 2625 microseconds beginning 5250 microseconds after the first pulse $t_{d1}$ was transmitted.

The proposed lidar jammer would attempt to create false speed readings by transmitting a pulse train having a pulse repetition frequency that matches the pulse repetition frequency of the typical lidar speed monitor (380 pulses per second) and always arrives ahead of the reflected signal. The proposed lidar jammer would transmit the first pulse of the pulse train so that it arrives at the lidar speed monitor at time $t_{i1}$ before the third pulse transmitted by the lidar speed monitor is expected to return to the lidar speed monitor at time $t_{a3}$. The lidar speed monitor would compute a range based on the time difference between sending the third pulse at time $t_{d3}$ and receiving the first inserted pulse at time $t_{i1}$, which is a shorter range than was computed based on the time difference between sending the second pulse at time $t_{d2}$ and receiving the second reflected pulse at time $t_{a2}$. The proposed lidar jammer would attempt to vary the pulse spacing to create "out of range" speed readings that would disable the lidar speed monitor.

Such proposed laser jammers would be deficient for several reasons. First, the lidar jammer must measure the pulse repetition frequency of the monitor laser beam transmitted by the lidar speed monitor with very high accuracy, which requires expensive components and is prone to error. Second, the lidar jammer must transmit in the jamming laser beam a pulse train having a pulse repetition frequency that accurately matches the pulse repetition frequency of the monitor laser beam of the lidar speed monitor. Third, even if it were possible to accurately measure and match the pulse repetition frequency of the monitor laser beam, such lidar jammers can be defeated simply by adjusting the lidar speed monitor to transmit a pulse train having an unstable, random, or programmed pulse repetition rate.

SUMMARY OF THE INVENTION

The invention is directed to a method and device for disabling a laser-based speed monitor of the type that transmits a monitor laser beam at a moving object, such as a motor vehicle. The method includes detecting when the monitor laser beam transmitted by the speed monitor arrives at the motor vehicle. In response to detecting the monitor laser beam, the method transmits a jamming laser beam to the speed monitor. The jamming laser beam includes a plurality of pulses separated from each other by a time period that is less than or equal to an amount of time needed for the monitor laser beam to travel from the speed monitor to the moving object and back to the speed monitor. While jamming the speed monitor with the jamming laser beam, the method outputs a warning to a user of the motor vehicle so that the user can reduce the speed of the motor vehicle.

Preferably the method includes several features that contribute to the safety and feasibility of the invention. First, the method preferably transmits the jamming laser beam only for a time period sufficiently long to enable the user to reduce the speed of the vehicle. Second, the method preferably provides a backup system that senses when a laser transmitter has transmitted the jamming laser beam longer than desired and disconnects the laser transmitter from its power source. Third, the method preferably prevents interference between speed monitor jammers in adjacent vehicles by triggering the transmission of the jamming laser beam only when the laser beam detected has a pulse repetition rate within a predetermined range of the pulse repetition frequency of the monitor laser beam. Fourth, the method preferably prevents transmission of extraneous jamming laser beams by disabling the laser transmitter when the motor vehicle is not in motion.

The device for temporarily disabling the speed monitor is a laser transponder positioned on the motor vehicle. The laser transponder includes a laser detector that detects the monitor laser beam transmitted by the speed monitor and transmits a detection signal in response to detecting the monitor laser beam. The laser transponder also includes a warning device coupled to the laser detector. The warning device provides a warning that indicates that the speed monitor has been detected by the laser detector. A timer coupled to the laser detector transmits a laser connect signal for a predetermined time period sufficient to enable the user to decrease the speed of the moving object. A laser transmitter coupled to the timer transmits the jamming laser beam to the speed monitor for the predetermined time period in response to the laser connect signal. As in the method, the jamming laser beam includes a plurality of pulses separated from each other by a time period that is less than an amount of time needed for the monitor laser beam to travel from the speed monitor to the motor vehicle and back to the speed monitor. Preferably, the laser transponder includes a diode laser designed to transmit the jamming laser beam and a pulse generator that activates the diode laser in a manner that causes the diode laser to transmit the plurality of pulses in the jamming laser beam.

DETAILED DESCRIPTION OF THE DRAWINGS

The invention is directed to a method and apparatus for disabling a laser-based speed monitor, known as a lidar speed monitor, that is attempting to determine the speed of a moving object, such as a motor vehicle. The method and apparatus of the invention disables the lidar speed monitor by transmitting to the lidar speed monitor a jamming laser beam that includes a pulse train having a high pulse repetition frequency. The pulse repetition frequency of the pulse train transmitted according to the invention is sufficiently high to ensure that a pulse from the pulse train always reaches the lidar speed monitor before a pulse transmitted by the lidar speed monitor can be reflected off the motor vehicle and back to the lidar speed monitor, except for the first pulse transmitted by the lidar speed monitor.

The lidar speed monitor is disabled with the jamming laser beam without attempting to match the pulse repetition frequency of the monitor laser beam transmitted by the lidar speed monitor. A lidar speed monitor typically determines the speed of a motor vehicle between approximately 500 and 1500 feet from the motor vehicle. The speed of the monitor laser beam used to interrogate the motor vehicle is the speed of light (i.e., $9.836 \times 10^8$ feet per second). As a result, at a distance of 500 feet, the monitor laser beam has a round trip flight time of approximately 1.16 microseconds and at 1500 feet, the round trip flight time is approximately 3.48 microseconds. Thus, by transmitting in the jamming laser beam a pulse train with a constant pulse repetition frequency of approximately 0.86 MHz or greater (1/1.16 microseconds), the invention ensures that a pulse will always arrive at the lidar speed monitor before a pulse in the monitor laser beam can make the 1.16 microsecond round trip between the lidar speed monitor and the vehicle. In other words, the pulse repetition frequency of the jamming laser beam should be greater than or equal to the speed of the monitor laser beam (light speed) divided by the quantity of two times a preselected minimum distance between the lidar speed monitor and the motor vehicle (round trip distance). Although 0.86 MHz is sufficient to disable the lidar speed monitor at 500 feet, the invention preferably employs a pulse train with a pulse repetition frequency of 2 MHz to ensure that the lidar speed monitor can be disabled when the lidar speed monitor is only 250 feet from the motor vehicle.

Figure 2:
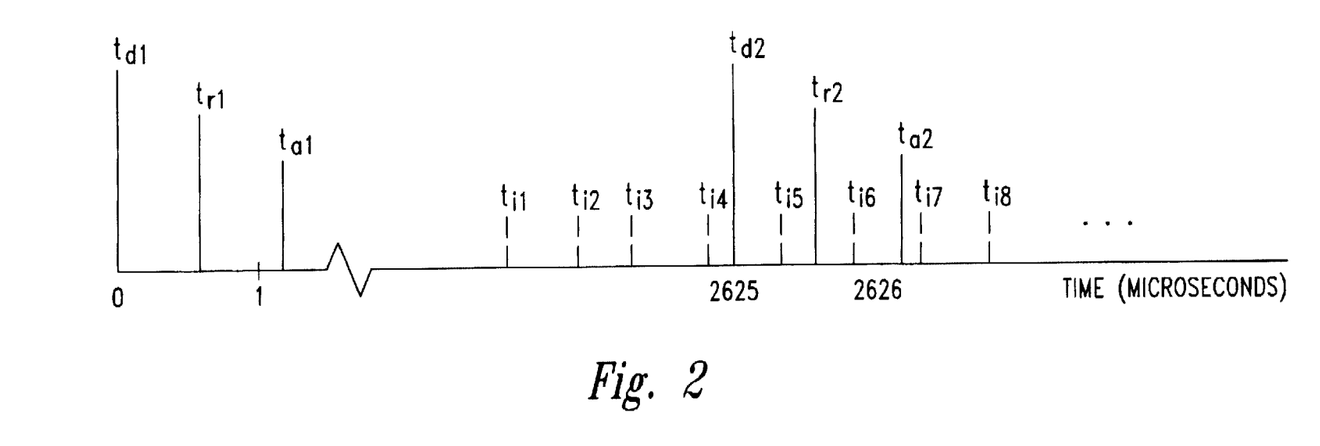
FIG. 2 is a timing diagram showing the pulses of the jamming laser beam transmitted according to the present invention.

The invention can be understood more clearly with respect to the timing diagram shown in FIG. 2. The lidar speed monitor transmits a monitor laser beam with a first pulse at time $t_{d1}$. The first pulse of the monitor laser beam is reflected off the motor vehicle at time $t_{r1}$ and the reflected first pulse is detected at the lidar speed monitor at time $t_{a1}$. Assuming that the motor vehicle is 500 feet from the lidar speed monitor, the monitor laser beam takes approximately 1.16 microseconds to travel to the motor vehicle and back to the lidar speed monitor at time $t_{a1}$. Instead of trying to determine and match the pulse repetition frequency of the monitor laser beam like prior art lidar jammers, the present invention simply transmits a pulse train with a high, constant pulse repetition frequency with each pulse of the pulse train being indicated by a dashed line in FIG. 2. In the example shown in FIG. 2, the pulse repetition frequency of the inserted pulse train is 2 MHz (two million pulses per second), which ensures that at least one pulse of the pulse train arrives at the speed monitor before a pulse transmitted by the speed monitor can be reflected off of the vehicle back to the speed monitor when the speed monitor is 250 feet or more away from the vehicle. For example, the fifth inserted pulse of the pulse train arrives at the lidar speed monitor at time $t_{i5}$, which is well before a reflected second pulse of the monitor laser beam returns to the lidar speed monitor at time $t_{a2}$. It will be appreciated that the first inserted pulse arriving at the lidar speed monitor need not be the fifth inserted pulse of the jamming laser beam and instead could be any of the inserted pulses of the jamming laser beam.

Figure 3:
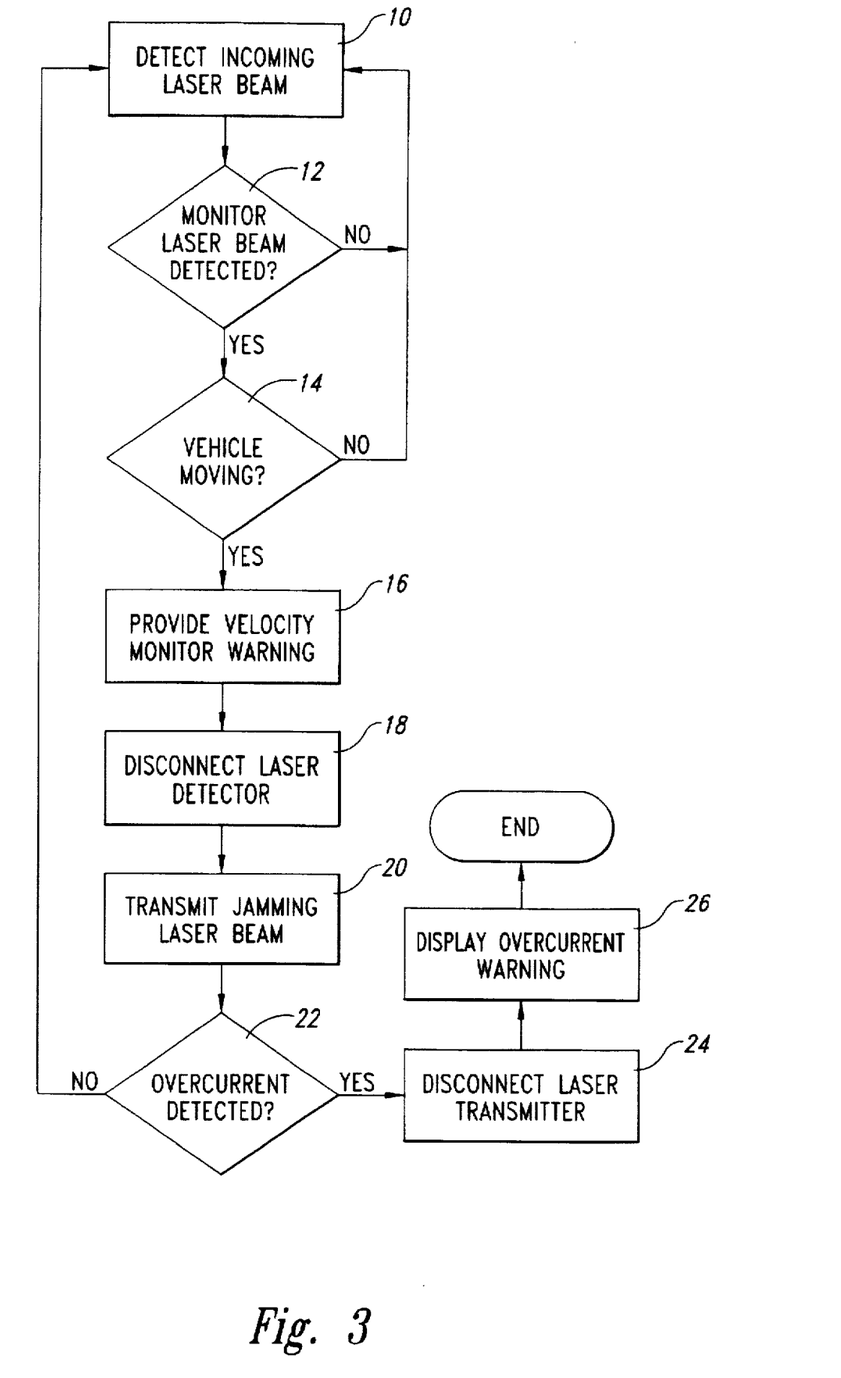
FIG. 3 is a flow diagram showing a method for temporarily disabling a speed monitor according to the present invention.

A flowchart of the method for disabling the lidar speed monitor according to the present invention is shown in FIG. 3. In step 10 the method detects an incoming laser beam. In step 12 the method determines whether the incoming laser beam detected corresponds to a typical monitor laser beam from a lidar speed monitor. Step 12 is used to make sure that a laser beam from a source other than a lidar speed monitor does not trigger the transmission of a jamming laser beam. For example, if step 12 is not performed, then a jamming laser beam from a lidar jammer on another motor vehicle could trigger transmission of an unnecessary jamming laser beam. Therefore, if the laser beam detected does not correspond to a monitor laser beam from a typical lidar speed monitor, then the method returns to step 10 for the detection of another laser beam.

If the incoming laser beam detected is determined to be a monitor laser beam in step 12, then the method determines whether the motor vehicle is moving in step 14. If the motor vehicle is not moving, then the method returns to step 10 to detect another laser beam without transmitting a jamming laser beam. If step 14 is not included, then a lidar speed monitor could trigger a transmission of jamming laser beam from a parked car. Thus, step 14 reduces the possibility of eye damage to pedestrians walking in front of the parked car. Alternatively, step 14 could determine whether the engine of the motor vehicle was running at greater than a threshold number of revolutions per minute (RPMs). In addition, step 14 could determine whether the engine of the motor vehicle was running based on the voltage of the motor vehicle's battery.

If step 14 determines that the motor vehicle is moving, then the method provides a lidar speed monitor warning to the motor vehicle driver in step 16. The lidar speed monitor warning can be an audible warning, a visual warning, or a combination of such warnings. The warning can last for several seconds or can simply be a short burst of sound or light sufficient to indicate to the motor vehicle driver that the monitor laser beam from a lidar speed monitor has been detected.

During the provision of the lidar speed monitor warning in step 16, the method disconnects the laser detector in step 18. Further, in step 20 the method transmits the jamming laser beam to the lidar speed monitor. Disconnecting the laser detector in step 18 ensures that the jamming laser beam transmitted in step 20 does not retrigger the timer that triggers the generation of the jamming laser beam. Alternatively, one could employ a timer having a retrigger capability that is automatically disabled for some time after the timer triggers the generation of the jamming laser beam. As discussed above, the jamming laser beam includes a pulse train having a constant pulse repetition frequency sufficient to ensure that a pulse always reaches the lidar speed monitor before a pulse transmitted by the lidar speed monitor is reflected back to the lidar speed monitor (e.g., 2 MHz).

The invention preferably transmits the jamming laser beam in step 20 only for a sufficient period of time to enable the motor vehicle driver to reduce the speed of the motor vehicle (e.g., 5–10 seconds). Limiting the duration of the jamming laser beam transmission reduces the possibility of injury to pedestrians in the path of the jamming laser beam. In addition, limiting the duration of the jamming laser beam transmission reduces the load on the laser transmitter and enables the use of a less expensive laser transmitter.

In step 22 the method determines whether an overcurrent condition has occurred. Such an overcurrent condition could result if the circuitry causing the jamming laser beam to be transmitted does not turn off the laser beam transmission after the predetermined time period provided to enable the motor vehicle driver to reduce the speed of the motor vehicle. Alternatively, the overcurrent condition could be caused by repeated retriggering of the laser transmitter with successive pulses. If an overcurrent condition is detected in step 22, then the method disconnects the laser transmitter from its power source in step 24. In addition, the method displays an overcurrent warning to the motor vehicle driver in step 26. If no overcurrent condition is detected, then the method simply returns to step 10 for detection of another monitor laser beam.

Figure 4:
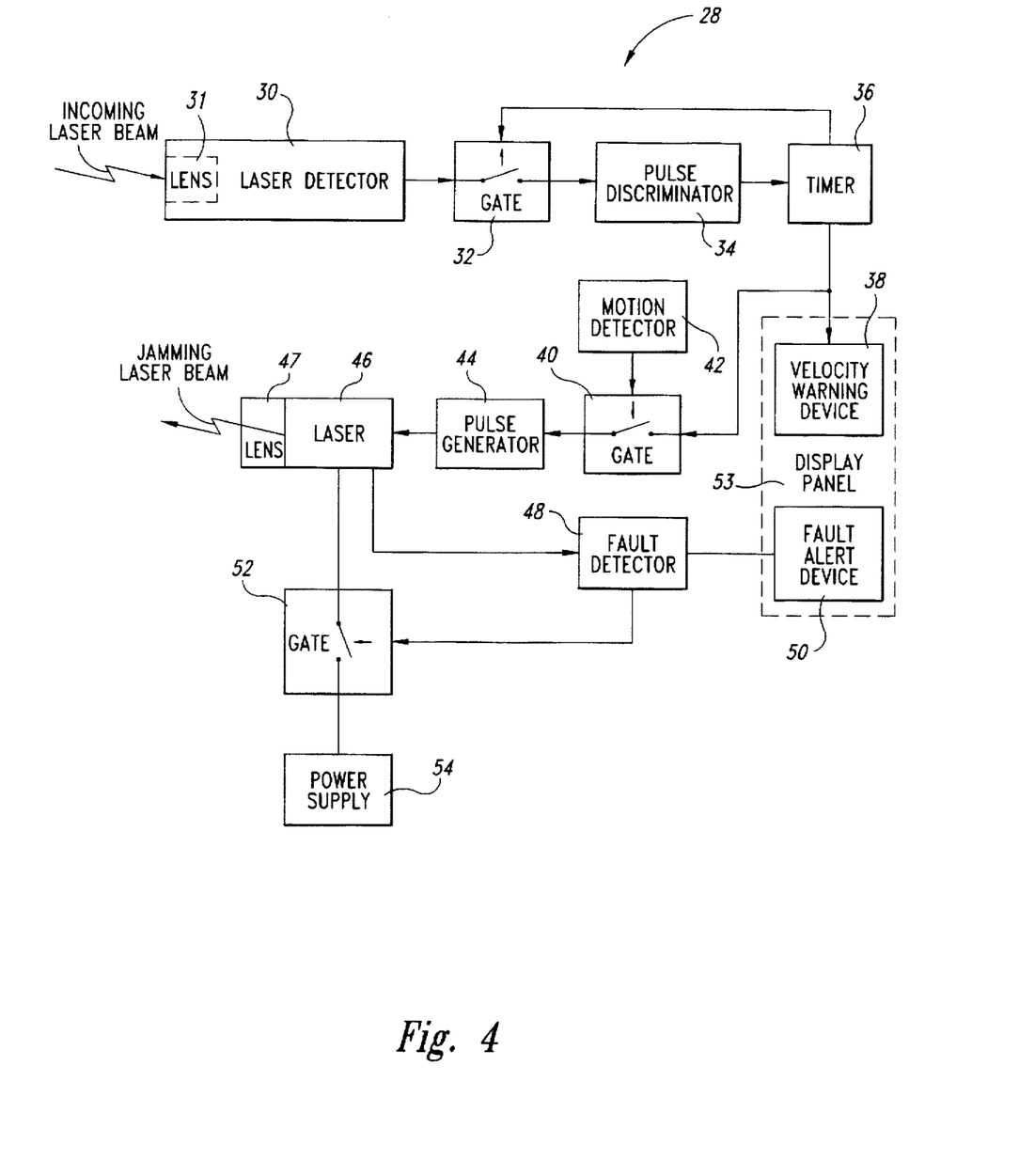
FIG. 4 is a block diagram of a laser transponder for temporarily disabling a speed monitor according to the present invention.

A laser transponder 28 for disabling the lidar speed monitor is shown in FIG. 4. The laser transponder 28 includes a laser detector 30 that detects the monitor laser beam transmitted by the lidar speed monitor. The optical divergence angle of the monitor laser beam typically is approximately 4 milliradians which gives the monitor laser beam a 2 foot cross-sectional radius at a range of 1000 feet. The primary target of the speed monitor is the motor vehicle license plate because the license plate is coated with a retro-reflective paint that results in the best reflection from typical motor vehicles. As a result, to detect the monitor laser beam, the laser detector 30 should be positioned on or immediately adjacent the motor vehicle license plate. In addition, the laser detector preferably includes a lens 31 with a relatively narrow optical acceptance angle (e.g., 20°) in order to maximize the monitor laser beam signal received by the laser detector 30.

In response to detecting the monitor laser beam from the speed monitor, the laser detector 30 outputs a detection signal. The laser transponder 28 includes a gate 32 and a pulse discriminator 34. The gate 32 is normally closed so that the detection signal from the laser detector 30 is passed on to the pulse discriminator 34. The pulse discriminator 34 determines whether the incoming laser beam detected by the laser detector 30 matches the monitor laser beam that is typically output by lidar speed monitors. If the pulse discriminator 34 determines that the incoming laser beam is a monitor laser beam, then the pulse discriminator passes the detection signal to a timer 36.

In response to the detection signal, the timer 36 transmits a timing pulse to three components of the laser transponder 28: the gate 32, a speed warning device 38, and a motion detector gate 40. The timing pulse opens the gate 32 so that the laser detector 30 is disconnected from the remainder of the laser transponder 28. As discussed above, the disconnection of the laser detector 30 prevents retriggering of the jamming laser beam by reflected pulses of the laser transponder 28. In response to the timing pulse, the speed warning device 38 outputs a visual and/or audible warning to the motor vehicle driver in order to allow the driver to reduce the speed of the motor vehicle. Preferably, the timing pulse is sufficiently long (e.g., 10 seconds) to enable the motor vehicle driver to sufficiently reduce the speed of the motor vehicle in a safe manner.

The laser transponder 28 also includes an optional motion detector 42 that senses whether the motor vehicle is in motion. Such a motion detector 42 can be implemented using many common automotive electronic devices, such as the speedometer present in all motor vehicles. Alternatively, engine RPM monitors and battery voltage monitors can be used as discussed above. When a motor vehicle is in motion, the motion detector 42 closes the motion detector gate 40 in order to enable the timing pulse to pass to a pulse generator 44.

In response to the timing pulse received from the timer 36 via the motion detector gate 40, the pulse generator 44 generates a pulse train having a constant pulse repetition frequency that is sufficiently high to disable the lidar speed monitor as discussed above. The pulse generator 44 transmits the pulse train to a laser 46 after activation by the timing pulse from the timer 36 via the motion detector gate 40. The pulse train transmitted by the pulse generator 44 causes the laser 46 to transmit the jamming laser beam to the lidar speed monitor as discussed above. It will be appreciated that the laser 46 is used rather than a light emitting diode (LED) because current LEDs do not generate light beams of sufficient power or spectral purity to disable the lidar speed monitor. A lens 47 is positioned in the path of the jamming laser beam and is structured to cause the jamming laser beam to diverge a predetermined amount sufficient to direct the jamming laser beam at the speed monitor.

The laser transponder 28 includes a fault detector 48 coupled to the laser 46. The fault detector 48 checks for an overcurrent condition that could result from a fault in the laser transponder circuitry allowing the laser 42 to transmit the jamming laser beam longer than desired. When such an overcurrent condition occurs, the fault detector 48 causes a fault alert device 50 to alert the motor vehicle driver with a visual and/or audible warning. In addition, the fault detector 48 closes a power gate 52 which disconnects a power supply 54 from the laser 46 and thereby turns off the laser 46. The speed warning device 38 and the fault alert device 50 are at least in part mounted within the motor vehicle on a display panel 53.

Figure 5A:
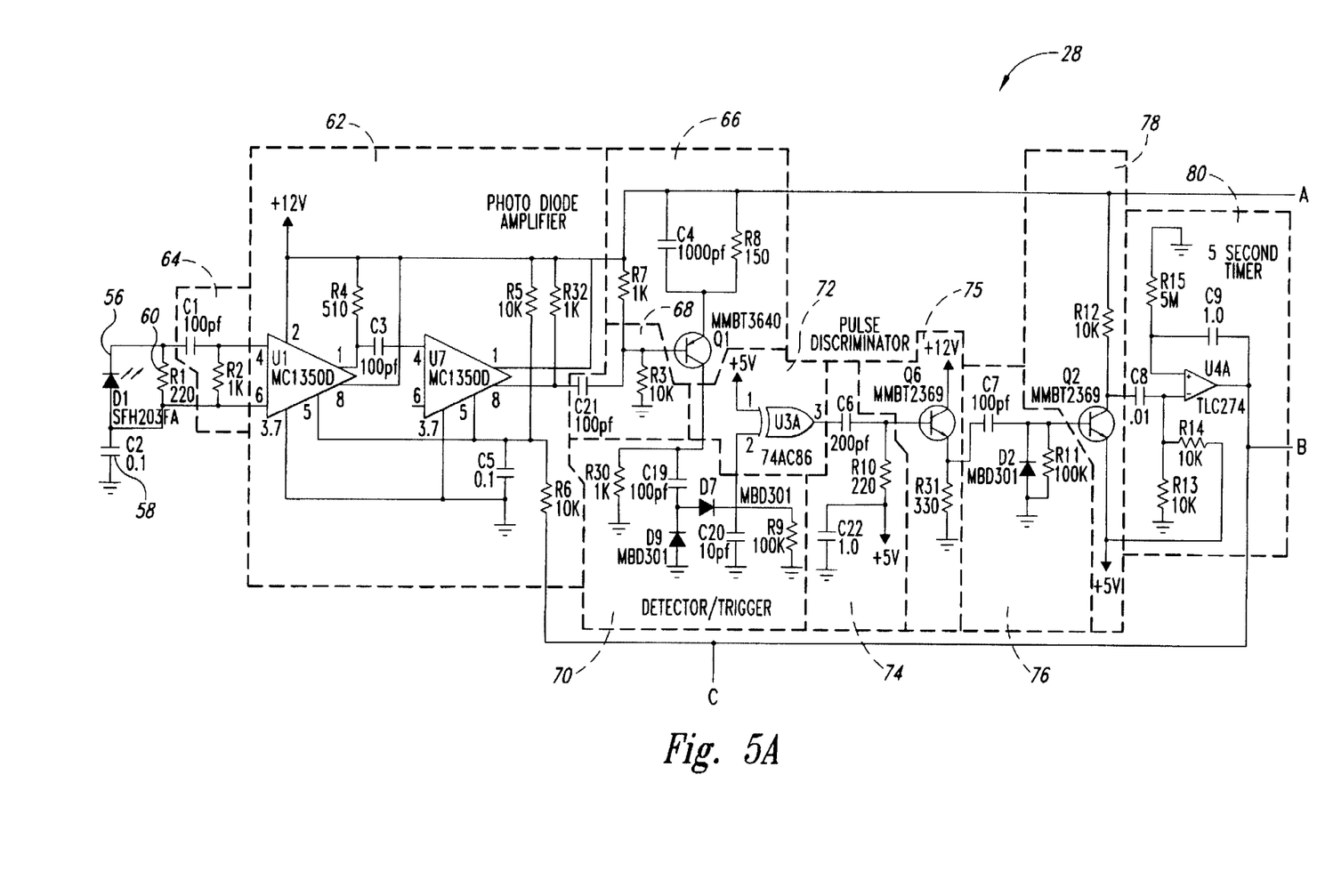
FIGS. 5A–5D together are a circuit diagram depicting a preferred embodiment of the laser transponder shown in FIG. 4.

A preferred embodiment of the laser transponder 28 is shown in FIGS. 5A–5D. The laser transponder 28 includes a photodiode 56 that receives an incoming laser beam (FIG. 5A). In a preferred embodiment, the photodiode 56 is a silicon photodiode, such as the SFH 203 FA by Siemens. The Siemens photodiode includes a 200 nM-wide spectral filter centered on a wavelength of 900 nM, which is close to the 905 nM wavelength typical of the monitor laser beams transmitted by current lidar speed monitors. Such a spectral filter is used to prevent background daylight from triggering the laser detector 30. The Siemens photodiode also features a built-in lens 31 (FIG. 4) with a relatively narrow (20°) optical acceptance angle in order to maximize the monitor laser beam signal received by the laser detector 30.

The photodiode 56 is connected to ground via a capacitor 58 and is also connected in parallel with a load resistor 60. The incoming laser beam causes the photodiode to develop a laser detection signal across the load resistor 60. The laser detector signal on the load resistor 60 is provided to a high frequency Motorola MC1350 amplifier circuit 62 via a high pass filter 64. The high frequency amplifier circuit 62 has a 30–50 MHz bandwidth which, in combination with the high pass filter 64, optimizes the signal-to-noise ratio of the laser detection signal for a signal that arises from a 15 nanosecond pulse in the incoming laser beam. Thus, the amplifier circuit 62 and the high pass filter 64 together comprise a matched filter. In addition, the amplifier circuit 62 includes AGC inputs that turn off the amplifier circuit 62, and thus, implement the gate 32 shown in FIG. 4.

The amplified laser detection signal output by the high frequency amplifier circuit 62 is transmitted to a PNP transistor circuit 66 via an RC network 68. The PNP transistor circuit 66 is coupled to a diode rectifier circuit 70. The PNP transistor circuit 66, RC circuit 68 and diode rectifier 70 stretch the narrow, 15 nanosecond pulse of the amplified laser detection signal output by the amplifier circuit 62 to a signal pulse over 500 microseconds in width. A CMOS inverter 72 connected to the diode rectifier circuit 70 is triggered by the 500 microsecond signal pulse. The CMOS inverter 72 inverts the 500 microsecond signal pulse and outputs the inverted 500 microsecond signal pulse to an RC circuit 74. The RC circuit 74 differentiates the pulse to produce negative and positive signal pulses. The negative and positive signal pulses are passed to an emitter follower circuit 75 which amplifies the current of the signal pulses. A diode rectifier 76 adds both negative and positive signal pulses together to generate a signal pulse having a pulse height in excess of 5 volts if the negative and positive signal pulses are closely spaced. The 5 volt signal pulse triggers an NPN transistor circuit 78 biased with 5 volts on the emitter terminal of the NPN transistor used in the circuit.

Together the PNP transistor circuit 66, RC circuit 68, diode rectifier circuit 70, CMOS inverter 72, RC circuit 74, diode rectifier 76 and NPN transistor circuit 78 constitute a preferred embodiment of the pulse discriminator 34 shown in FIG. 4. The diode rectifier 76 discharges relatively slowly such that a long pulse does not trigger the NPN transistor circuit 78. Such a long pulse would be generated if the incoming laser beam included a pulse train with a high pulse repetition frequency, such as the 2 MHz pulse train transmitted by the laser 42 of another laser transponder of the preferred embodiment shown in FIG. 4. As a result, the pulse discriminator 34 implemented by the circuit elements 66–78 outputs a signal only if the incoming laser beam detected by the diode laser 56 has a pulse repetition frequency similar to the pulse repetition frequency of a typical lidar speed monitor.

Coupled to the NPN transistor circuit 78 is a one shot timer 80 that transmits a 5 second timing pulse when activated by the signal output by the NPN transistor circuit 78 (FIG. 5A). The timing pulse transmitted by the one shot timer 80 is transmitted to the AGC inputs of the high frequency amplifier circuit 62 which disconnects the photodiode 56 from the pulse discriminator 34 implemented by circuit elements 66–78. In addition, the timing pulse from the one shot timer 80 is transmitted to a piezo alarm 82 (FIG. 5C) which outputs an audible alarm to the user. The audible alarm output by the piezo alarm 82 indicates to the motor vehicle driver that a monitor laser beam transmitted by the lidar speed monitor has been detected.

Figure 5B:
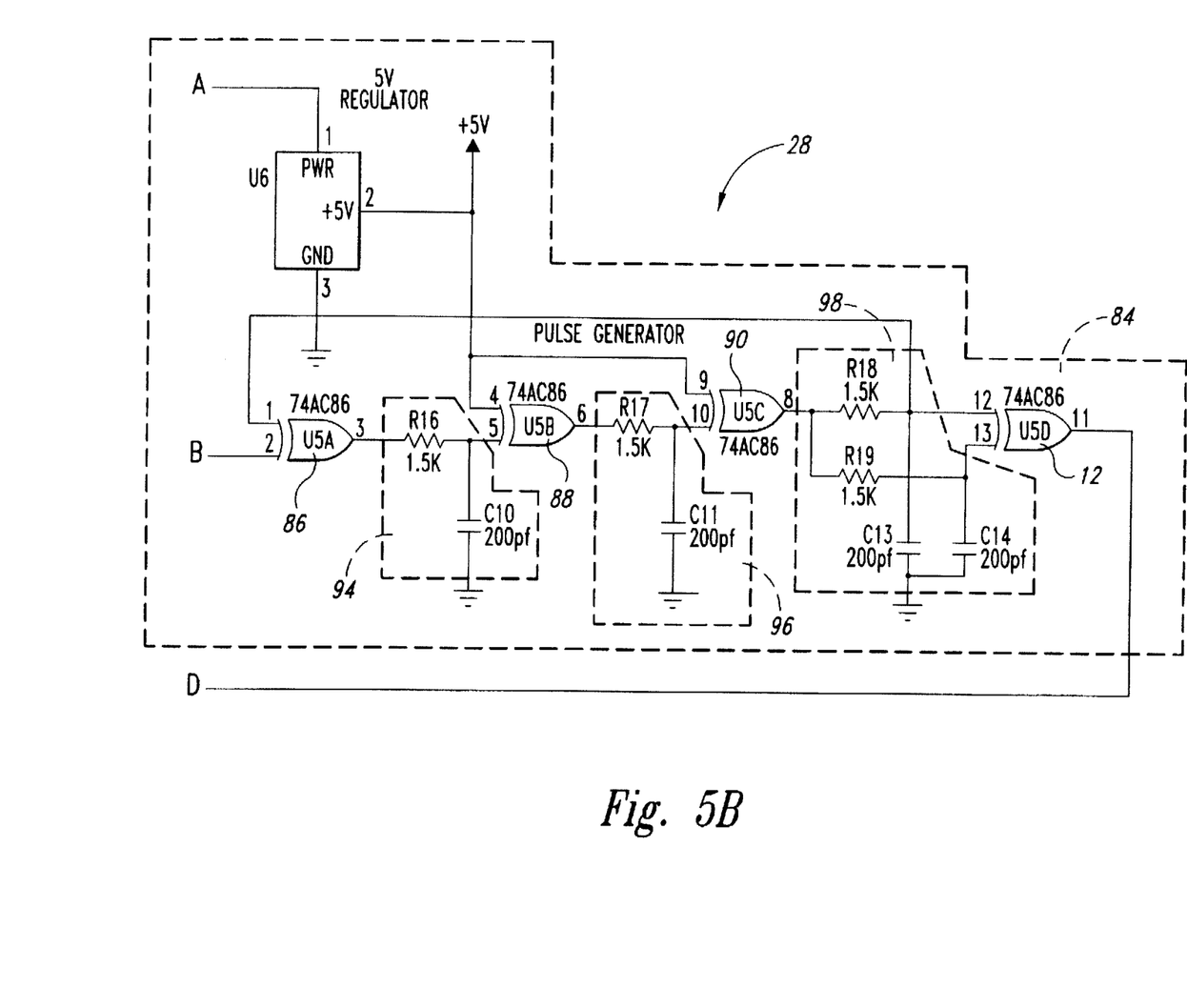

The timing pulse transmitted by the one shot timer 80 also is received by a pulse generator 84 shown in FIG. 5B. The pulse generator outputs 15 nanosecond pulses that are spaced 500 nanoseconds apart which results in a pulse train having a pulse repetition frequency of 2 MHz. The pulse generator 84 includes first, second, third, and fourth CMOS inverters 86, 88, 90, 92, respectively. First, second and third RC circuits 94, 96, 98, respectively, are positioned between the CMOS inverters 86, 88, 90, 92. Together the CMOS inverters 89–92 and RC circuits 94–98 of the pulse generator 84 form a 2 MHz oscillator. The third RC circuit 98 provides a differential delay in the input of the fourth CMOS inverter 92 which creates a single positive output pulse whose width is established by the mismatch between the third RC circuit 98 and the first and second RC circuits 94, 96.

Figure 5C:
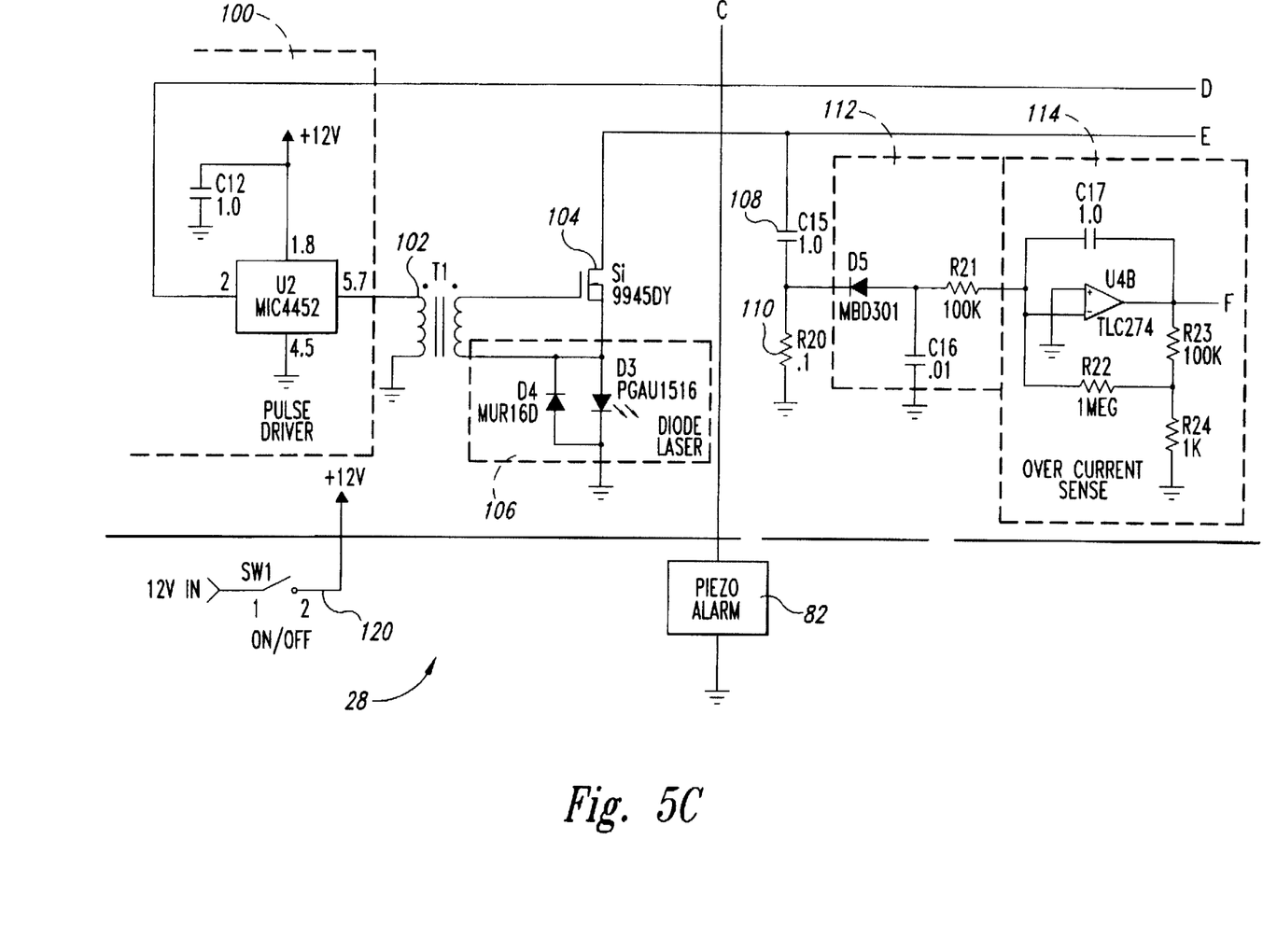

The pulse train produced by the pulse generator 84 is transmitted to a power MOSFET driver circuit 100 shown in FIG. 5C. The power MOSFET driver circuit 100 amplifies the pulse train received from the pulse generator 84. The power MOSFET driver circuit 100 drives a pulse transformer 102 and a high current, N-channel MOSFET switch 104. The pulse transformer 102 outputs a transformed pulse train to the MOSFET switch 104. The MOSFET switch 104 transmits 15 amp current pulses to a diode laser 106 when the transformed pulse train closes the MOSFET switch 104. The diode laser 106 is implemented in the preferred embodiment by a galium arsenide laser sold by EG&G Optoelectronics under the name PGAUISI6. In response to the pulses from the MOSFET switch 104, the diode laser transmits the jamming laser beam with the desired 2 MHz pulse train. The pulse transformer 102 is used instead of a direct drive in order to keep the cathode (case) of the diode laser 106 at ground potential.

It should be noted that diode lasers, such as the diode laser 106, are not characterized by the manufacturer to operate at the 1–2 Mhz pulse frequency of the jamming laser beam. We have found experimentally that for the short operating time used to transmit the jamming laser beam (5–10 seconds), adequate diode laser life can be obtained. The short operating time also eliminates elaborate heat sinking of the power devices of the laser transponder 28. As a result, it is possible to construct an inexpensive laser transponder 28 having a cost of not more than a few hundred dollars.

As discussed above with respect to FIG. 4, the laser transducer 28 includes the fault detector 48 that detects when an overcurrent condition occurs and disconnects the laser 42 from the power supply 50. In the preferred embodiment shown in FIGS. 5C and 5D, the fault detector 48 includes a capacitor 108 that provides energy for the pulse train transmitted to the diode laser 106 by the MOSFET switch 104 (see FIG. 5C). The capacitor 108 should have a low inductance and high current handling capabilities. The capacitor 108 can be constructed by paralleling many smaller capacitors in order to share current and thereby increase the current handling capabilities of the capacitor 108. A resistor 110 coupled to the capacitor 108 receives pulse current from the capacitor 108 and negative pulses are generated. A diode rectifier circuit 112 connected to the resistor 110 rectifies the negative pulses from the resistor 110. The diode rectifier circuit 112 is connected to an integrator circuit 114 which receives the rectified pulses from the diode rectifier circuit. Coupled to the integrator circuit 114 is a threshold/latch circuit 116 (see FIG. 5D) that is triggered by the output from the integrator circuit 114 if that output is greater than 5 volts. The output from the integrator circuit 114 will be sufficient to trigger the threshold/latch circuit 116 if the pulse train that triggers the diode laser 106 exceeds a predetermined time, such as 10 seconds. In addition, the integrator circuit 114 will also trigger the threshold/latch circuit 116 if the diode laser 106 is frequently retriggered by successive pulse trains. The threshold/latch circuit 116 is coupled to a P-channel MOSFET switch circuit 118 of FIG. 5D that shuts off when the threshold/latch circuit 116 is triggered into producing a high output signal. When the P-channel MOSFET switch circuit 118 shuts off, then the power to the N-channel MOSFET switch circuit 104 is disconnected, which turns off the diode laser 106. As a result, circuit elements 108–118 together implement a preferred embodiment of the fault detector 48 shown in FIG. 4.

Figure 5D:
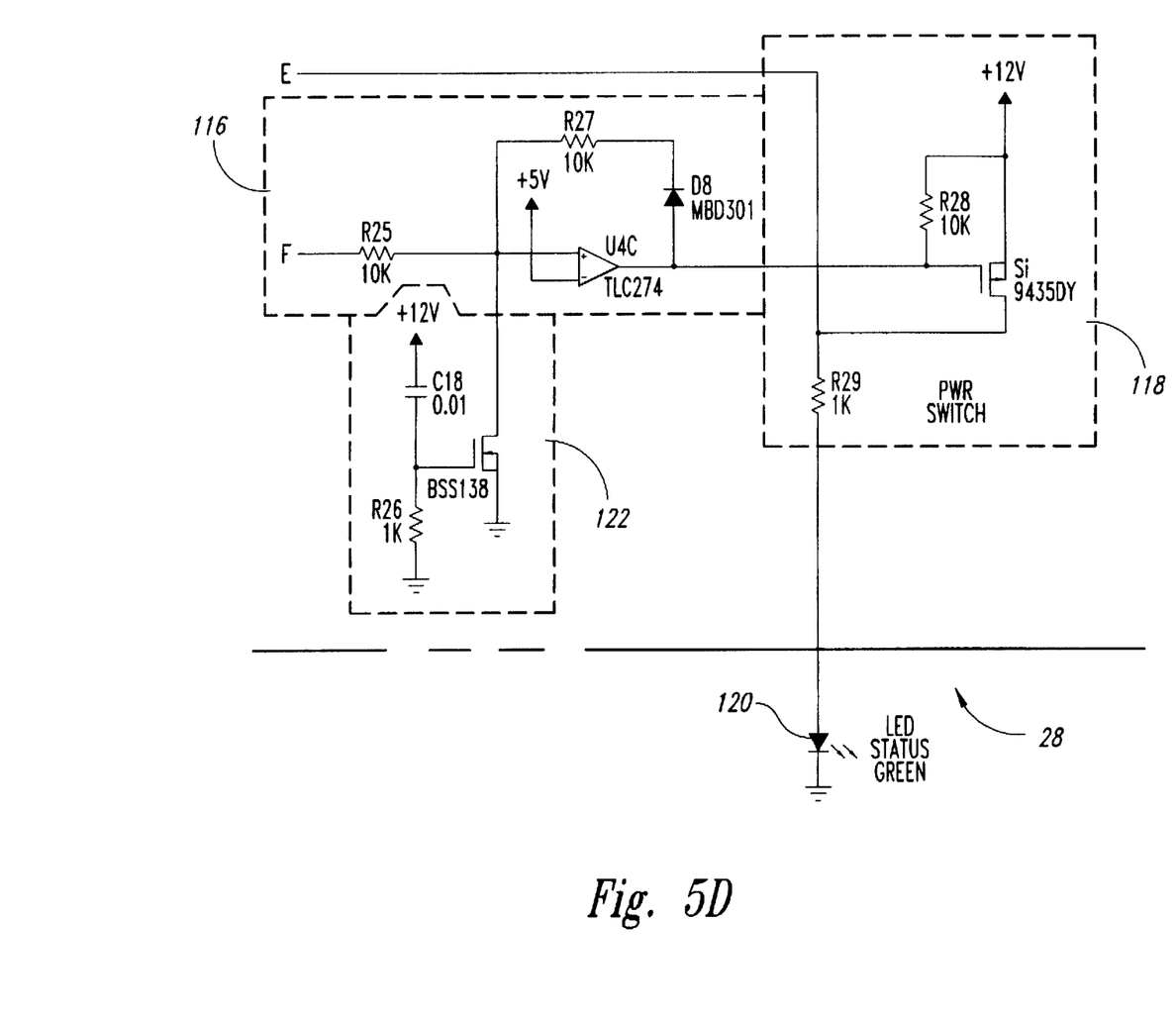

The P-channel MOSFET switch circuit 118 is coupled to an LED warning light 120. Under normal operating conditions, the P-channel MOSFET switch circuit 118 provides power to the LED warning light 120, which lights up to indicate that the laser transducer 28 is operating normally. When an overcurrent condition occurs, the shut off of the P-channel MOSFET switch circuit 118 removes power from the LED warning light 120, thereby indicating to the driver that an over current condition has occurred and the diode laser 106 has been turned off. As a result, the shut off of the P-channel MOSFET switch circuit 118 will prevent thermal damage to the semiconductor devices of the laser transducer 28 which are not rated for continuous duty in the embodiment shown in FIGS. 5A–5D. In addition, the shut off of the P-channel MOSFET switch circuit 118 will also prevent inadvertent eye exposure in the event of the over current condition. To reset the laser transducer 28, the motor vehicle driver can activate a power switch 122 (FIG. 5C) which triggers a pull down n-channel FET transistor circuit 124 (FIG. 5D). The pull down transistor circuit 122 returns the output of the integrator 116 to a low level which opens the P-channel MOSFET switch circuit 118 and returns the laser transducer 28 to normal operation.

The simplicity of the laser transducer 28 enables the laser transducer to be implemented in a housing (not shown) that can mount on a typical license frame of a motor vehicle. A housing dimension of 6 inch by 1 inch by ½ inch or less is feasible. The housing preferably is made from metal so that the housing can act as a heat sink for the diode laser 106.

It will be appreciated that the laser transducer 28 shown in FIGS. 4 and 5A–5D and the method shown in FIG. 3 enable a lidar speed monitor to be disabled for a sufficient period of time that enables a motor vehicle driver to reduce the speed of the motor vehicle in a safe manner. The laser transducer and method include numerous safety features that prevent inadvertent exposure to the jamming laser beam transmitted by the laser transducer. In addition, the laser transducer and method can be implemented in a relatively simple circuit that does not require the pulse repetition frequency of the lidar speed monitor to be analyzed and matched. In addition, the laser transducer and method disable the lidar speed monitor regardless of whether the pulse repetition rate of the monitor laser beam transmitted by the lidar speed monitor is constant, unstable, random, or programmed.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A laser transponder for detecting the use of a laser-based speed monitor, the speed monitor being of a type that transmits a monitor laser beam at a moving object, receives a reflected laser beam from the moving object, and determines the speed of the moving object based on the time elapsed between transmitting the monitor laser beam and receiving the reflected laser beam, the laser transponder comprising:

a laser detector positioned on the moving object to detect the monitor laser beam transmitted by the speed monitor and transmit a detection signal in response to detecting the monitor laser beam;

a warning device coupled to the laser detector, the warning device providing a warning to a user in response to receipt of the detection signal from the laser detector, the warning indicating that the speed monitor has been detected by the laser detector;

a timer coupled to the laser detector, wherein in response to receiving the detection signal from the laser detector, the timer transmits a laser-connect signal for a predetermined time period sufficient to enable the user to decrease the speed of the moving object; and a laser transmitter coupled to the timer, the laser transmitter being configured to transmit a jamming laser beam to the speed monitor in response to receiving the laser-connect signal from the laser detector, the jamming laser beam including a plurality of pulses separated from each other by a time period that is less than an amount of time needed for the monitor laser beam to travel from the speed monitor to the moving object and back to the speed monitor.

2. The laser transponder of claim 1 wherein the monitor laser beam transmitted by the speed monitor has an input carrier frequency and the laser transmitter includes:

a laser designed to transmit the jamming laser beam at an output carrier frequency equal to the input carrier frequency; and a pulse generator coupled to the laser, the pulse generator activating the laser in a manner that causes the laser to transmit the plurality of pulses in the jamming laser beam.

3. The laser transponder of claim 2, wherein the timer is coupled to the pulse generator and the laser-connect signal transmitted by the timer causes the pulse generator to activate the laser.

4. The laser transponder of claim 3, further including:

a laser detector switch coupled between the timer and the laser detector, the laser detector switch disconnecting the laser detector from the timer, for a period determined by the timer, in response to receiving the laser-connect signal from the timer.

5. The laser transponder of claim 1, further including:

a power supply coupled to the laser transmitter, the power supply providing power to the laser transmitter; and a fault detector coupled between the power supply and the laser switch, the fault detector detecting when the laser transmitter is transmitting the jamming laser beam for a longer than a preselected time period and disconnecting the power supply from the laser transmitter.

6. The laser transponder of claim 1, further including:

a pulse discriminator coupled between the laser detector and the laser transmitter, the pulse discriminator being constructed to determine from the detection signal whether the laser detector received the monitor laser beam or an alternate jamming laser beam transmitted by a similar laser transponder on a different moving object, the pulse discriminator enabling the timer to transmit the laser-connect signal when the laser detector receives the monitor laser beam and disabling the timer from transmitting the laser-connect signal when the laser detects the alternate jamming laser beam.

7. The laser transponder of claim 1, further including:

a lens positioned in a path of the jamming laser beam, the lens being structured to cause the jamming laser beam to diverge a predetermined amount sufficient to direct the jamming laser beam at the speed monitor.

8. A laser transponder for detecting the use of a laser-based speed monitor, the speed monitor being of a type that transmits a monitor laser beam at a moving object, receives a reflected laser beam from the moving object, and determines the speed of the moving object based on the time elapsed between transmitting the monitor laser beam and receiving the reflected laser beam, the laser transponder comprising:

a laser detector positioned on the moving object to detect the monitor laser beam transmitted by the speed monitor and transmit a detection signal in response to detecting the monitor laser beam; and a laser transmitter coupled to the laser detector, the laser transmitter being configured to transmit a jamming laser beam to the speed monitor in response to the detection signal, the jamming laser beam including a plurality of pulses occurring at a predetermined output pulse frequency that is greater than or equal to the speed of the monitor laser beam divided by a quantity of two times a preselected minimum distance between the speed monitor and the moving object.

9. The laser transponder of claim 8 wherein the monitor laser beam transmitted by the speed monitor has an input carrier frequency and the laser transmitter includes:

a laser designed to transmit the jamming laser beam at an output carrier frequency equal to the input carrier frequency; and a pulse generator coupled to the laser, the pulse generator activating the laser in a manner that causes the laser to transmit the plurality of pulses in the jamming laser beam.

10. The laser transponder of claim 9, further including:

a timer coupled to the laser detector, wherein in response to receiving the detection signal from the laser detector, the timer transmits a laser-connect signal for a predetermined time period which causes the pulse generator to activate the laser into transmitting the jamming laser beam.

11. The laser transponder of claim 10, further including:

a laser detector switch coupled between the timer and the laser detector, the laser detector switch disconnecting the laser detector from the timer, for a period determined by the timer, in response to receiving the laser-connect signal from the timer.

12. The laser transponder of claim 8, further including:

a warning device coupled to the laser detector, the warning device providing a warning to a user in response to receipt of the detection signal from the laser detector, the warning indicating that the speed monitor has been detected by the laser detector.

13. The laser transponder of claim 8, further including:

a power supply coupled to the laser transmitter, the power supply providing power to the laser transmitter; and a fault detector coupled between the power supply and the laser switch, the fault detector detecting when the laser transmitter is transmitting the jamming laser beam for longer than a preselected time period and causes the backup shutoff switch to disconnect the power supply from the laser transmitter.

14. The laser transponder of claim 8, further including:

a pulse discriminator coupled between the laser detector and the laser transmitter, the pulse discriminator being structured to determine from the detection signal whether the laser detector received the monitor laser beam or an alternate jamming laser beam transmitted by a similar laser transponder on a different moving object, the pulse discriminator enabling the timer to transmit the laser-connect signal when the laser detector receives the monitor laser beam and disabling the timer from transmitting the laser-connect signal when the laser detects the alternate jamming laser beam.

15. The laser transponder of claim 8, further including:

a lens positioned in a path of the jamming laser beam, the lens being structured to cause the jamming laser beam to diverge a predetermined amount sufficient to direct the jamming laser beam at the speed monitor.

16. A method for detecting the use of a laser-based speed monitor, the speed monitor being of a type that transmits a detection laser beam at a moving object, receives a reflected laser beam from the moving object, and determines the speed of the moving object based on the time elapsed between transmitting the detection laser beam and receiving the reflected laser beam, the method comprising:

detecting the monitor laser beam transmitted by the speed monitor; and transmitting a jamming laser beam to the speed monitor in response to detecting the monitor laser beam, the jamming laser beam including a plurality of pulses separated from each other by a time period that is less than an amount of time needed for the monitor laser beam to travel from the speed monitor to the moving object and back to the speed monitor.

17. The method of claim 16, further including:

outputting a warning to a user in response to detecting the monitor laser beam.

18. The method of claim 16 wherein the detecting step is performed by a laser detector connected to a power source and the method further includes:

disconnecting the laser detector from the power source while transmitting the jamming laser beam.

19. The method of claim 16 wherein the transmitting step includes transmitting the jamming laser beam for a predetermined time period sufficient to enable the user to decrease the speed of the moving object and the method further includes stopping the transmission of the jamming laser beam after the predetermined time period has elapsed.

20. The method of claim 16 wherein the transmitting step is performed by a laser transmitter connected to a power source and the method further includes:

sensing when the laser transmitter has transmitted the jamming laser beam longer than desired; and disconnecting the laser transmitter from the power source in response to the sensing step.

21. The method of claim 16 wherein the monitor laser beam has a predetermined pulse frequency, further including:

detecting an incoming laser beam;

sensing whether the incoming laser beam has a pulse frequency within a predetermined range of the predetermined pulse frequency of the monitor laser beam; and disabling the transmission of the jamming laser beam if the pulse frequency of the incoming laser beam is not within the predetermined range.

* * * * *